US012711066B2

(12) United States Patent
Liu et al.

(10) Patent No.: US 12,711,066 B2
(45) Date of Patent: Aug. 18, 2026

(54) DDR BUFFER DEVICE EQUALIZATION FOR SELF-TRAINING MODE

(71) Applicant: Advanced Micro Devices, Inc., Santa Clara, CA (US)

(72) Inventors: Tsun-Ho Liu, Boxborough, MA (US); David Da-Wei Lin, Westborough, MA (US); Aaron John Nygren, Boise, ID (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 135 days.

(21) Appl. No.: 18/768,716

(22) Filed: Jul. 10, 2024

(65) Prior Publication Data

US 2025/0139004 A1 May 1, 2025

Related U.S. Application Data

(60) Provisional application No. 63/594,747, filed on Oct. 31, 2023.

(51) Int. Cl.
*G11C 29/00* (2006.01)
*G06F 12/06* (2006.01)

(52) U.S. Cl.
CPC ................................ *G06F 12/0684* (2013.01)

(58) Field of Classification Search
CPC ...................... G11C 2207/2254; G11C 29/028
See application file for complete search history.

(56) References Cited

U.S. PATENT DOCUMENTS

2020/0076652 A1 3/2020 Shi et al.
2022/0190844 A1 6/2022 Rose et al.
2022/0300197 A1 * 9/2022 Sethuraman .......... G06F 3/0673
2023/0298642 A1 9/2023 Partsch et al.

FOREIGN PATENT DOCUMENTS

CN 111930578 A 11/2020

OTHER PUBLICATIONS

International Search Report and Written Opinion for PCT/US2024/037693 dated Oct. 28, 2024.

* cited by examiner

*Primary Examiner* — Alfredo Bermudez Lozada
(74) *Attorney, Agent, or Firm* — Patterson + Sheridan, LLP

(57) ABSTRACT

Embodiments herein describe a method and system for configuring device equalization self-training mode (DESTM) controls using in-band signaling, the DESTM controls including at least setting a minimum duration time, using a host to enable the DESTM controls, triggering a buffer to perform a self-training mode, sending linear-feedback shift register (LFSR) patterns to the buffer for the minimum duration time, and waiting for the minimum completion time to end before disabling the DESTM. The minimum duration time indicates a time that the self-training mode is active and is predefined. The buffer executes the self-training mode within the predefined minimum duration time.

20 Claims, 5 Drawing Sheets

300

400

START

ENABLE COMMUNICATION BETWEEN A SYSTEM-ON-CHIP (SoC) AND A DUAL IN-LINE MEMORY MODULE (DIMM), THE DIMM INCLUDING A PLURALITY OF BUFFERS — 402

ENABLE A DEVICE EQUALIZATION SELF-TRAINING MODE (DESTM) FOR THE PLURALITY OF BUFFERS OF THE DIMM — 404

CONFIGURE A PREDEFINED MINIMUM DURATION TIME FOR A SELF-TRAINING MODE BY USING IN-BAND SIGNALING — 406

ALLOW A HOST TO ENABLE THE PREDEFINED MINIMUM DURATION TIME — 408

TRIGGER AT LEAST ONE BUFFER OF THE PLURALITY OF BUFFERS TO PERFORM THE SELF-TRAINING MODE — 410

SEND LINEAR-FEEDBACK SHIFT REGISTER (LFSR) PATTERNS TO THE AT LEAST ONE BUFFER THE PLURALITY OF BUFFERS DURING THE PREDEFINED MINIMUM DURATION TIME — 412

WAIT FOR THE PREDEFINED MINIMUM DURATION TIME TO END BEFORE DISABLING THE SELF-TRAINING MODE — 414

END

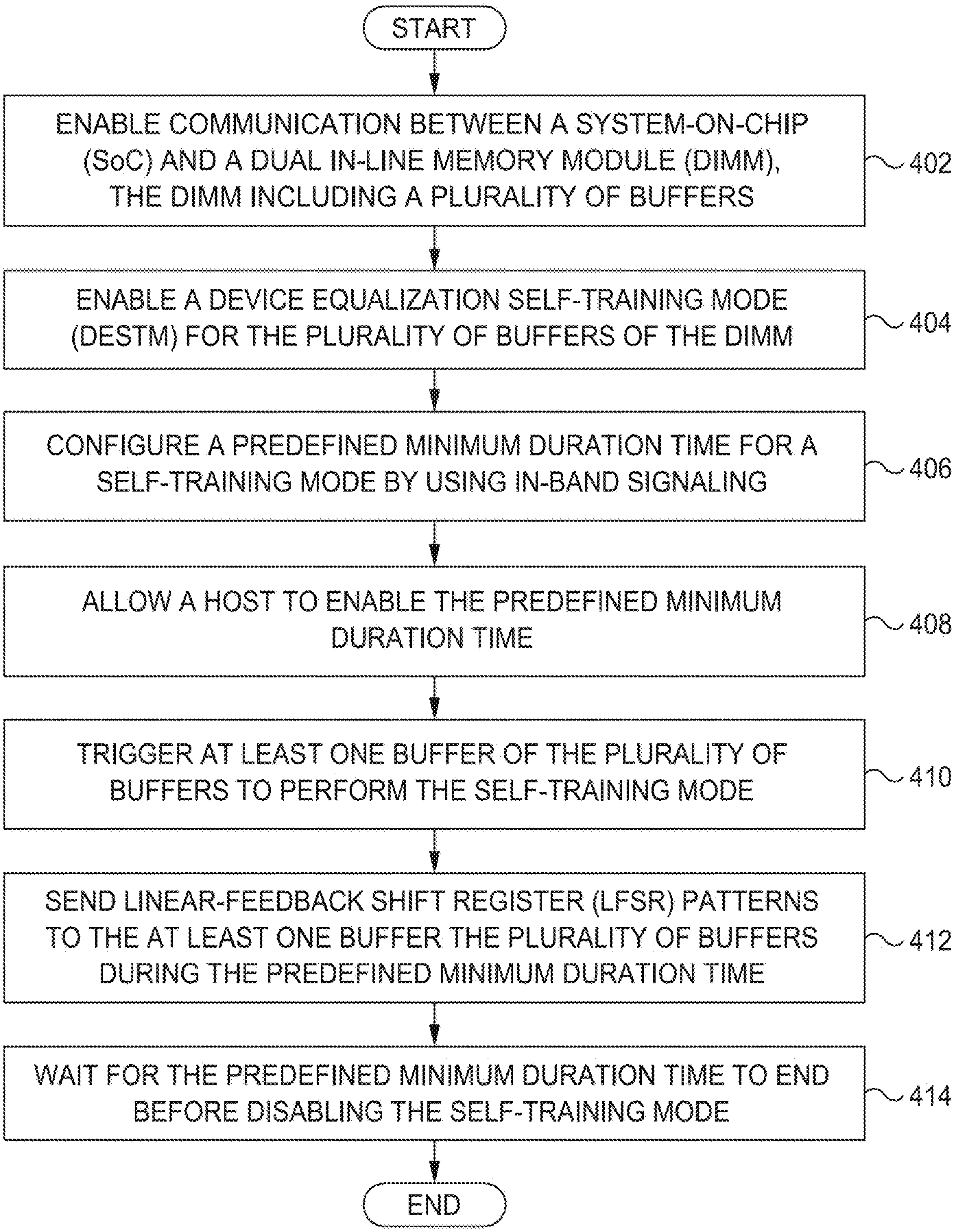

FIG. 4

DDR BUFFER DEVICE EQUALIZATION FOR SELF-TRAINING MODE

CROSS-REFERENCE TO RELATED APPLICATIONS

This application claims priority to the U.S. Provisional Patent Application Ser. No. 63/594,747 filed Oct. 31, 2023 of which is incorporated herein by reference in its entirety.

TECHNICAL FIELD

Examples of the present disclosure generally relate to using buffer equalization self-training during a mission mode when access to sideband signals is not feasible or is not preferable.

BACKGROUND

As the number of cores in a modern processor increase, higher memory bandwidth is required to unleash the computational power of a central processing unit (CPU). Boosting memory bandwidth is the primary driver for developing DDR5, the fifth generation of double data rate (DDR) technology. Compared to DDR4, DDR5 doubles the data transfer rate while supporting a larger memory density. There are several different techniques that are used to enable these higher transfer rates. One of the techniques is an equalization technique called decision feedback equalization (DFE). DFE is an equalization technique that enables DDR5 to support higher input/output (I/O) speeds. Although DFE is a reliable solution to achieve higher data rates, its coefficient may be recalibrated over time. Moreover, buffer device equalization, such as DFE, has been proposed for a buffer self-training mode. However, such buffer self-training mode is enabled by using only sideband signals, thus limiting capabilities of host systems or system-on-chips (SoCs).

SUMMARY

One embodiment described herein is an apparatus including a host processor that configures device equalization self-training mode (DESTM) controls using in-band signaling, the DESTM controls including at least setting a minimum duration time, enables the DESTM controls, triggers the data buffer to perform a self-training mode, sends linear-feedback shift register (LFSR) patterns to the data buffer for the minimum duration time, and waits for a minimum completion time to end before disabling the DESTM.

One embodiment described herein is a memory including a data buffer having interface logic and data path logic that configures device equalization self-training mode (DESTM) controls using in-band signaling, the DESTM controls including at least setting a minimum duration time, enables the DESTM controls, triggers the data buffer to perform a self-training mode, sends linear-feedback shift register (LFSR) patterns to the data buffer for the minimum duration time, and waits for a minimum completion time to end before disabling the DESTM.

One embodiment described herein is a system including a memory and a host processor in communication with the memory, the host processor configuring device equalization self-training mode (DESTM) controls using in-band signaling, the DESTM controls including at least setting a minimum duration time, enabling the DESTM controls, triggering a data buffer in the memory to perform a self-training mode, sending linear-feedback shift register (LFSR) patterns to the data buffer for the minimum duration time, and waiting for a minimum completion time to end before disabling the DESTM.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 illustrates a method for performing buffer device equalization self-training with in-band signals for buffers of a dual in-line memory module (DIMM), according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
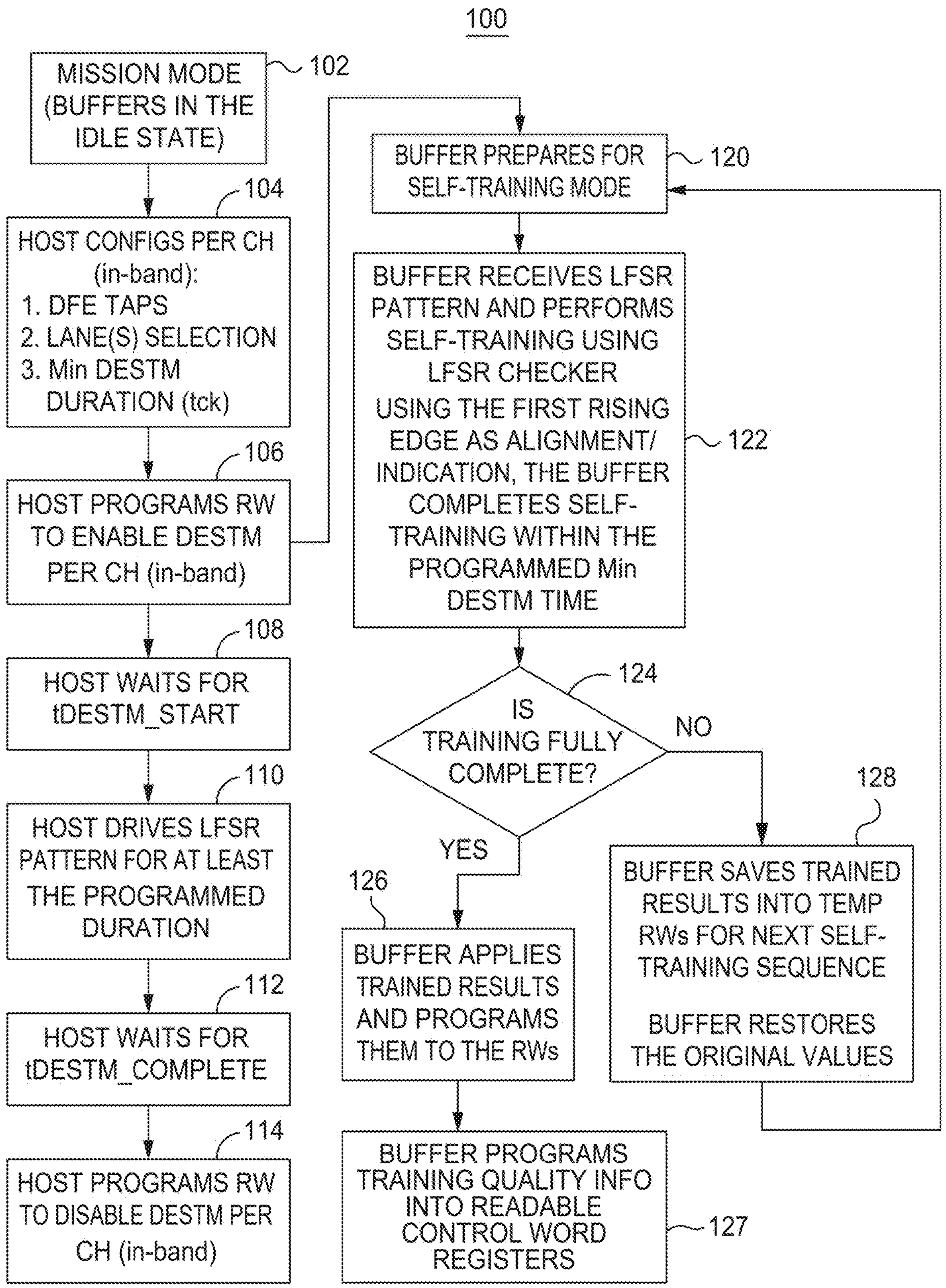
FIG. 1 illustrates a flowchart for performing double data rate (DDR) buffer device equalization self-training with in-band signals, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

In-band signaling involves sending control information within the same band or channel used for data. This is in contrast to out-of-band signaling which is sent over a different channel, or even over a separate network. Every system transmits data signals and control signals. The data signals are the reason for the transmission in the first place, and the control signals start, stop, and manage the session. When the data and control signals are transmitted within the same channel or frequency, the signaling is referred to as "in-band" signals. When control signals reside in a channel separate from the data, they are referred to as "out-of-band" signals.

The sidebands carry the information transmitted normally at a lower speed than in-band signals. The sidebands require other components to perform such control information transmission. As a result, additional synchronization is required between the components performing sideband control information transmission and the components performing in-band data transmission.

The Joint Electron Device Engineering Council (JEDEC) Solid State Technology Association is an independent semiconductor engineering trade organization and standardization body. JEDEC was established to provide recognized technical standards for a wide range of applications, from how to handle electronic packages and defining package outline drawings, to the methods used to characterize performance. JEDEC's goal is to create common standards that can be used by manufacturers and consumers. Having universal standards for technologies lowers the chance of misunderstandings and confusion for consumers when selecting a product, and facilitates the interchangeability of products.

Semiconductor memory plays an important role in the development of countless electronic devices ranging from computers and gaming consoles to televisions and telecommunications products. JEDEC standards encompass virtually every key standard for semiconductor memory in the market today.

Regarding DDR5, JEDEC published JESD79-5 DDR5 SDRAM standard in July 2020, and a second update, JESD79-5B, in August 2022. The standard addresses demand requirements being driven by intensive cloud and enterprise data center applications, providing developers with twice the performance and much improved power efficiency.

Regarding DDR4, JEDEC published it in September 2012 and most recently updated it in January 2020, and the JEDEC DDR4 standard has been defined to provide higher performance, with improved reliability and reduced power, thereby representing a significant achievement relative to previous dynamic random access memory (DRAM) memory technologies.

High-speed serial links such as those used in DDR4 and DDR5 are subject to a variety of signal degradation challenges. Insertion losses, frequency dependent attenuation and inter-symbol interference (ISI), as well as others, are among the most commonly encountered sources of signal degradation. When a rectangular pulse is transmitted, it suffers distortion, which is apparent when it reaches the receiver. It may be broadened due to group delay dispersion because different frequency components of the signal propagate along the signal path at differing velocities. Moreover, impedance mismatches can cause reflections that propagate back and forth over the channel.

Generally, these signal losses can be compensated for by using any of several equalization techniques. The commonly used equalization techniques are feed forward Equalization (FFE), Continuous Time Linear Equalizations (CTLE), and Decision Feedback Equalization (DFE).

DFE is a non-linear equalizer which quantizes the signals and feeds back discrete symbols. DDR5 specifies the use of DFE. DFE is used rather than FFE or CTLE because DFE provides equalization without increasing the noise level on the signal. FFE and CTLE boost the high frequency response of the channel to compensate for the channel's frequency dependent attenuation. The boost is the result of an analog filtering process. This has the effect of increasing noise and noise-like effects like crosstalk. The slicer stages in DFE quantize the signal ignoring the noise voltage, and it does not propagate noise to the output of the equalizer. As such, DFE provides for a high frequency boost without the noise.

In DDR5 and buffers, multi taps decision feedback equalization (DFE) was specified to mitigate the loss and reflection without amplifying noise. Equalization aims to manipulate the signal so as to compensate for the loss and dispersion of the channel. DFE helps by mitigating the effects of ISI. ISI is the effect that a given symbol has on the response from subsequent symbols observed at the receiver. ISI can be caused by signals reflected due to improper termination, large capacitive loads in the channel, or dispersion effects where different frequencies are attenuated by different amounts (usually, the higher frequencies are attenuated more than the lower frequencies, thus causing the channel to behave like a low-pass filter).

Adding a buffer device equalization self-training mode in DDR technology has been suggested, where such mode could only be initiated using sideband signals, which would be useful during boot time. However, such self-training mode could not be implemented during a mission mode because sideband signals are slow and this self-training process requires additional interactions between higher level firmware and memory subsystems. Moreover, sideband signals may be inaccessible during the mission mode.

In accordance thereof, the example embodiments propose a system and method that does not limit buffer-based equalization in the self-training mode to only sideband signals. Instead, the buffer-based equalization in the self-training mode can be expanded to in-band signals. Using in-band signals allows buffer-based equalization during the mission mode, that is, during runtime. Using in-band signals further allows the removal of unnecessary interactions between the memory subsystem and higher level firmware. This expansion to in-band signaling for buffer-based equalization in the self-training mode is not limited to register clock drivers (RCDs), but can also be scaled to DDR data buffers (DBs). As such, the exemplary embodiments can be applied to both buffer components, RCD and DB.

The RCD is a component of a dual in-line memory module (DIMM). DIMM comprises a series of dynamic random-access memory (RAM) components on a small circuit board with pins that connect it to the computer motherboard. A DIMM stores each data bit in a separate memory cell. One type of DIMM is a registered DIMM (RDIMM) that is configured to meet the rigors of compute-intensive operations, such as for server systems running non-stop. An RCD is also a component of RDIMM and LRDIM/MRDIMM is constructed by both RCD and DB components.

In operation, the RCD first receives instructions or commands from the CPU before sending them to the memory modules. The RCD serves as a "mediator" between the CPU and the DRAMs, that is, the CA and CS signals are buffered by the RCD, and then transfers from the RCD to the DRAMs on the rising edge of the next clock signal. This results in instructions taking longer, but the buffering reduces the strain on the CPU's memory controller and helps reduce the impact on signal integrity. The main purpose of the RCD and DB are to maintain the same memory speed even during heavy workloads. The DB or DDR DB transfers n bits of data per clock cycle between the SoC and the DRAMs. The DB is a memory storage element that is used to temporarily store data while the data is being moved between the SoC and the DRAMs.

Therefore, a DIMM or LRDIMM/MRDIMM has both buffer components, that is, RCD and DB. The DIMM is plugged into a motherboard to communicate with, e.g., a system-on-chip (SoC). The SoC can also be referred to as a host. The SoC can sequence the RCD or buffer component into the self-training mode. The self-training mode is focused on equalization, such as DFE for DDR5 technology. After self-training is completed, more accurate equalization values are obtained, as equalization values can be changed over time when, e.g., operating at a high frequency.

According to the suggestion to add a buffer device equalization self-training mode that could be initiated by using sideband signals, the host or SoC would program a setup, e.g., pertaining to various configurations. The SoC would drive, e.g., a linear-feedback shift register (LFSR) pattern. The SoC would then enable the programming of such bit by employing sideband signals only. However, communication devices do not only use sideband signals. Communication devices also use in-band signals. For example, a SidebandBus may not communicate with SoC pins. The suggested approach indicates that a register within the buffer component is programmed through the SidebandBus and not through the DDR interface. As such, in-band signaling is not compatible with the current suggested approach in adding a buffer device equalization self-training mode.

The example embodiments extend the capability of the equalization self-training mode to in-band signaling. In other words, initialization of the equalization self-training mode can also be performed by in-band signaling, and not just by the SidebandBus. As such, the equalization self-training mode is not limited only during boot time, but can be extended to apply during the mission mode, that is, when the system or SoC is up and running (during runtime). The equalization self-training mode is implemented using in-band signals by changing the equalization values in the registers when the buffer has fully completed the self-training mode during a predefined minimum time duration, which indicates a time that the self-training mode is active. The minimum time duration is a new feature added to the registers of the DIMM that enables operating using in-band signaling.

FIG. 1 illustrates a flowchart 100 for performing double data rate (DDR) buffer device equalization self-training with in-band signals, according to an example.

The flowchart 100 enables all configurations to be performed with in-band signaling and to be performed during a mission mode, that is, during runtime.

Buffer device equalization in self-training mode is a process used in memory systems to automatically adjust and optimize the signal integrity between the memory controller and the memory modules. This process is beneficial for ensuring reliable and high-performance data transfers, especially in high-speed memory systems such as DDR4 and DDR5. Buffer devices, such as data buffers or registered buffers, are used in memory modules (e.g., registered DIMMs or load-reduced DIMMs) to buffer data signals and improve signal integrity. Buffer devices help to reduce the electrical load on the memory controller and ensure stable communication over high-speed memory buses. Equalization refers to the process of adjusting the electrical characteristics of the signals, such as amplitude, timing, and impedance, to compensate for signal degradation caused by factors like long transmission lines, noise, and interference. The goal is to achieve a clean, stable signal that can be reliably interpreted by the receiving device. In self-training mode, the buffer devices autonomously perform the adjustments without requiring manual intervention or extensive control from the memory controller. The self-training mode involves the buffer devices measuring the signal quality and making real-time adjustments to optimize performance.

At block 102, in the mission mode, the buffers are in an idle state. The capability to communicate directly with the DIMMs is available. As such, features can be added to the registers (RCD and DB) of the DIMMs to accomplish the in-band signaling capability. Configuring device equalization in self-training mode with in-band signaling involves setting up a system where the memory controller and memory devices communicate and adjust signal parameters through the data path itself, rather than using out-of-band signals or separate control paths.

At block 104, the host or SoC configures the peripheral devices by using in-band signaling. A DFE equalization technique is employed and DFE taps are processed. A tap is a point on a delay line corresponding to a certain delay. Additionally, a minimum duration time (tck) feature is provided. The minimum duration time (tck) is set or predefined or predetermined by the user based on a desired application. For example, the buffer vendors or manufacturers can determine or set this variable. Once a buffer vendor or manufacturer determines an appropriate number for such variable, it can be programmed in the RCD and/or DB of the DIMM.

At block 106, the host or SoC programs the registers (RW). The SoC can provide enablement by, e.g., using a control register. In another example, the enablement can be provided by a new command. In practice, as long as there is a trigger mechanism, the buffer (e.g., RCD or DB) understands that this is the start of the minimum DESTM start time.

At block 108, the host or SoC waits for a start of the minimum DESTM start time. In the meantime, the buffer (e.g., RCD or DB) goes into self-training mode at block 120. The wait time of the SoC can also be set or predefined or predetermined. The wait time of the SoC can be synchronized with the start of the present minimum DESTM start time.

At block 120, the buffer prepares for entry into the self-training mode. Stated differently, the buffer starts to perform self-training.

At block 122, the buffer receives an LFSR pattern and performs self-training by using an LFSR checker. Using the first rising edge as an alignment or indication, the buffer completes self-training within the programmed preset minimum duration time (Min DESTM duration time). DESTM stands for device equalization self-training mode.

At block 110, once the tDESTM_START wait time is over, the host or SoC drives the LFSR pattern for at least the programmed minimum duration time (Min DESTM duration time). During this time, the buffer uses the first rising edge of the agreed upon times to detect and use the first rising edge as a first alignment or first indication. As such, a bit need not be used to inform the buffer to restart the self-training mode. The buffers can self-detect when to start the self-training mode by employing the first rising edge of the agreed upon times (i.e., wait time and minimum duration time, which are both preset). Also, the subsequent patterns can be easily computed based on the shift registers. As such, the alignment can be achieved by using the detection of the first rising edge from the buffer itself. In other words, the duration of the LFSR patterns sent depends on the minimum duration time and block 110 represents how long of a time frame the LFSR patterns are sent until the buffer completes the self-training mode (by using those LFSR patterns).

At block 112, the host or SoC waits for the minimum completion time (Min DESTM completion time) to end. Once this time limit is reached, the process can then proceed to block 124.

At block 124, it is determined whether the self-training mode has been fully completed. If YES, the process proceeds to block 126. If NO, the process proceeds to block 128.

At block 126, if the self-training mode has been fully completed, the buffer applies the trained results and programs them to the registers (RWs). In other words, the changed or updated or new equalization values are moved or placed into the registers. The equalization values are changed because the self-training mode has been fully completed.

At block 127, at completion, buffers program an abstraction level of information indicating training quality into readable only control word registers. This gives the SoC a reference for comparing different training results.

At block 128, if the self-training mode has not been fully completed, the buffer saves the trained results into temporary RWs or temporary registers for the next self-training sequence. The buffer also restores the original values. In other words, the original or initial equalization values are maintained within the registers.

Moreover, if the self-training mode is time-multiplexed, then several iterations of the self-training mode may be executed.

As such, the method determines whether the self-training mode is fully complete, and based on that determination, either changes the equalization values or maintains the original equalization values in the registers.

Once the self-training mode has ended, the process proceeds to block 114.

At block 114, the host or SoC programs the registers (RW) to disable DESTM. The system periodically exits the self-training mode and periodically enters the self-training mode. When the system re-enters the self-training mode, the buffer can either start the self-training mode from where it left off (if it was not fully completed) or it can restart the self-training mode anew (if it was fully completed).

This flow can be referred to as a self-contained flow within the buffer, as there is no need for the host or SoC to manage that self-training state. Instead, such self-training state is self-managed by the buffer.

Therefore, in summary, an agreement is reached concerning runtime duration and an agreement is reached regarding alignment (using the first rising edge). Additionally, an agreement is reached that the buffer will be self-contained and will manage its own state to push back correct equalization values to the registers. The equalization values can be fully trained values or partially trained values, the computed partially trained values being stored (and not used) such that the initial or original values are maintained within the registers. As such, sequencing the buffer in the self-training mode by using in-band signals is achievable, thus enabling self-training in the mission mode. It is contemplated that the buffers of the DIMM, RDIMM, or LRDIMM/MRDIMM that receive updated or new equalization values are both the RCD buffers and the DB buffers.

Configuring device equalization in self-training mode with in-band signaling involves setting up a system where the memory controller and memory devices communicate and adjust signal parameters through the data path itself, rather than using out-of-band signals or separate control paths.

From a host perspective, the host or host processor initiates the self-training mode by sending a specific command or sequence over the data path that signals the start of the training process. If necessary, the host can send initial training parameters, such as timing and voltage levels, using encoded patterns within normal data transfers.

During execution, the host continuously monitors the feedback from the memory devices. This feedback is typically encoded in the normal data response from the memory devices. Based on the feedback received, the host adjusts the signal parameters iteratively. This might include changes in voltage swing, timing adjustments, and impedance settings. After completion, the host ensures that the signal integrity and timing parameters are within acceptable limits by performing a series of read/write tests. Once the optimal settings are determined, the host may lock these settings to ensure stable operation.

From a memory perspective, upon receiving the in-band signal to start training, memory devices enter self-training mode. Memory devices may measure the current signal quality parameters such as voltage levels, noise, and timing margins. During execution, the memory devices use in-band signaling to send feedback to the memory controller. This feedback can be encoded within normal data responses or using reserved data patterns. Based on commands received from the host processor and internal measurements, memory devices adjust their equalization settings. This could involve changing the impedance, modifying signal timings, or adjusting voltage levels. After completion, and after the optimal parameters are found, the memory devices stabilize these settings and exit self-training mode. Memory devices resume normal operation with the newly optimized settings in place.

From a system perspective, the system firmware may initiate the training sequence during the system boot-up or a specific maintenance cycle. The system ensures that sufficient resources and time are allocated for the training process. This might involve temporarily reducing memory traffic from other components. Regarding monitoring and logging, the system continuously monitors the training process to ensure it completes successfully. This includes monitoring status registers and error logs. The system logs the training data, including initial and final settings, any errors encountered, and the overall success of the process. This data is useful for diagnostics and future optimizations. Regarding error handling, if the training process fails or suboptimal settings are found, the system can retry the process with adjusted parameters.

The benefits of using the self-training mode according to the process of FIG. 1 include automation to eliminate the need for manual tuning and intervention, saving time and reducing complexity, adaptability to continuously adapt to changing conditions, ensuring optimal performance over time, reliability to enhance signal integrity, leading to more reliable and error-free data transfers, and performance optimization to optimize the signal parameters to achieve higher data transfer rates and better overall memory performance. As such, buffer device equalization in self-training mode is an advanced feature in modern memory systems that enhances the reliability and performance of data transfers. By autonomously adjusting signal parameters, buffer devices ensure that the memory controller and memory modules communicate efficiently, even under varying conditions. This self-optimizing process is beneficial for maintaining high-speed and stable operation in contemporary computing environments.

Figure 2:
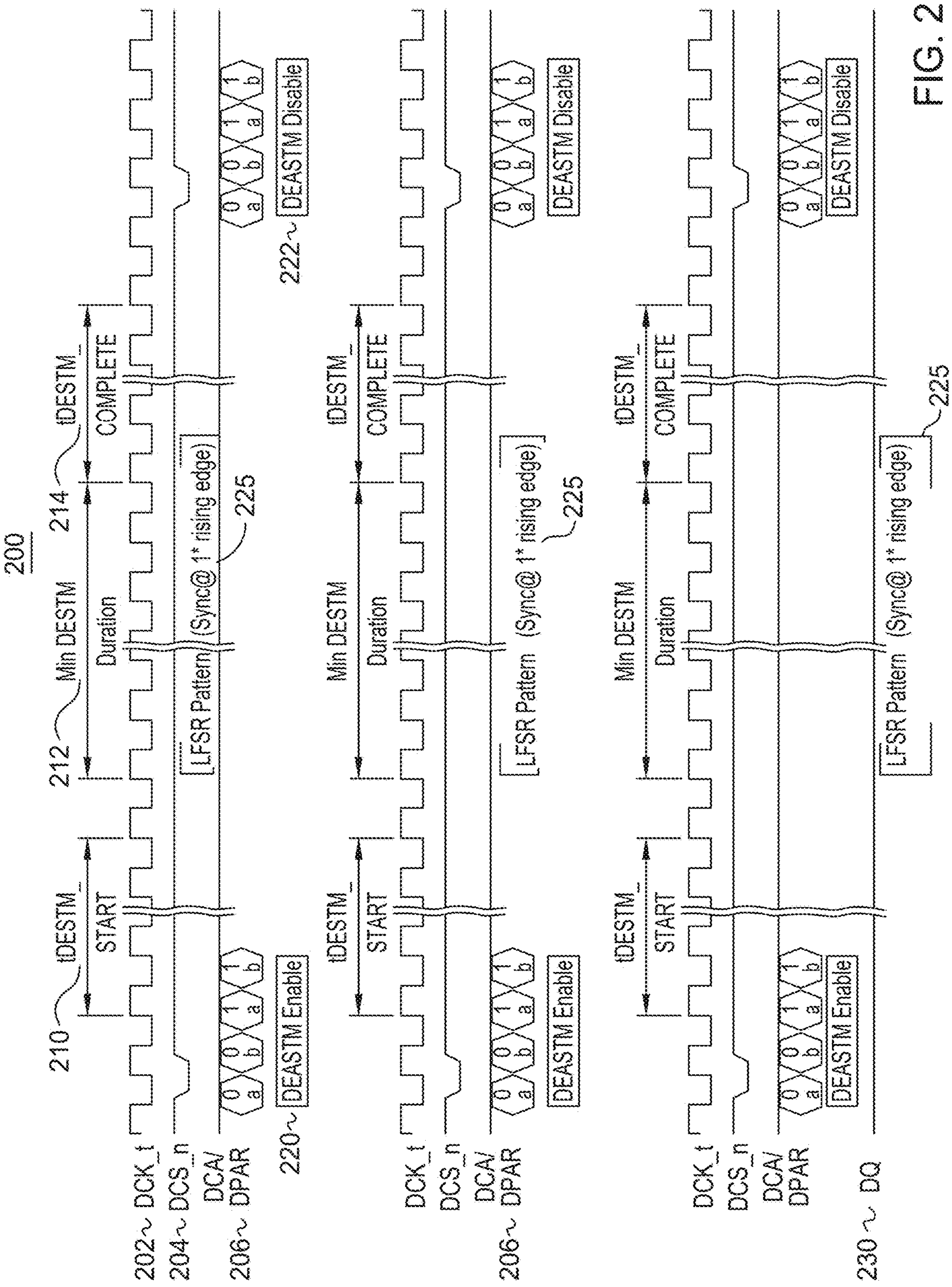
FIG. 2 illustrates a timing diagram with waveforms for performing DDR buffer device equalization self-training with in-band signals, according to an example.

FIG. 2 illustrates a timing diagram with waveforms 200 for performing DDR buffer device equalization self-training with in-band signals, according to an example.

Waveform 202 represents the in-band signal, waveform 204 represents the in-band chip select signal, and waveform 206 represents the command bus signal.

During interval 210, the host waits for the tDESTM_START. The wait time is predefined.

During interval 212, the host drives the LFSR patterns for at least the programmed duration (Min DESTM duration time). The host drives the LFSR patterns based on which lane or bus has been chosen to be trained. For example, it can be the CS pin or the CA pin or the data pin. The data pin is the data buffer.

During interval 214, the host waits until the DESTM time has ended. In other words, the host waits until <tDESTM_COMPLETE>. The buffer pushes the results (new equalization values) back to the registers and the host disables the DESTM. Anything occurring between the pattern comparisons, as well as managing the register being trained and applied, is managed by the buffer component itself.

The DESTM Enable 220 occurs before the start of the minimum duration time and the DESTM Disable 222 occurs after the end of the minimum duration time. The LFSR patterns 225 are driven by the host or SoC during the minimum duration time, such that they are synchronized with the first rising edge. In the top diagram, the LFSR patterns 225 are synchronized with the first rising edge when the patterns are sent to pins DCS_n. In the middle diagram, the LFSR patterns 225 are synchronized with the first rising edge when the patterns are sent to pins DCA/DPAR pins. In the top diagram, the LFSR patterns 225 are synchronized with the first rising edge when the patterns are sent to pins DQ.

The top two graphs pertain to the RCD, whereas the bottom graph pertains to the DB 230.

Figure 3:
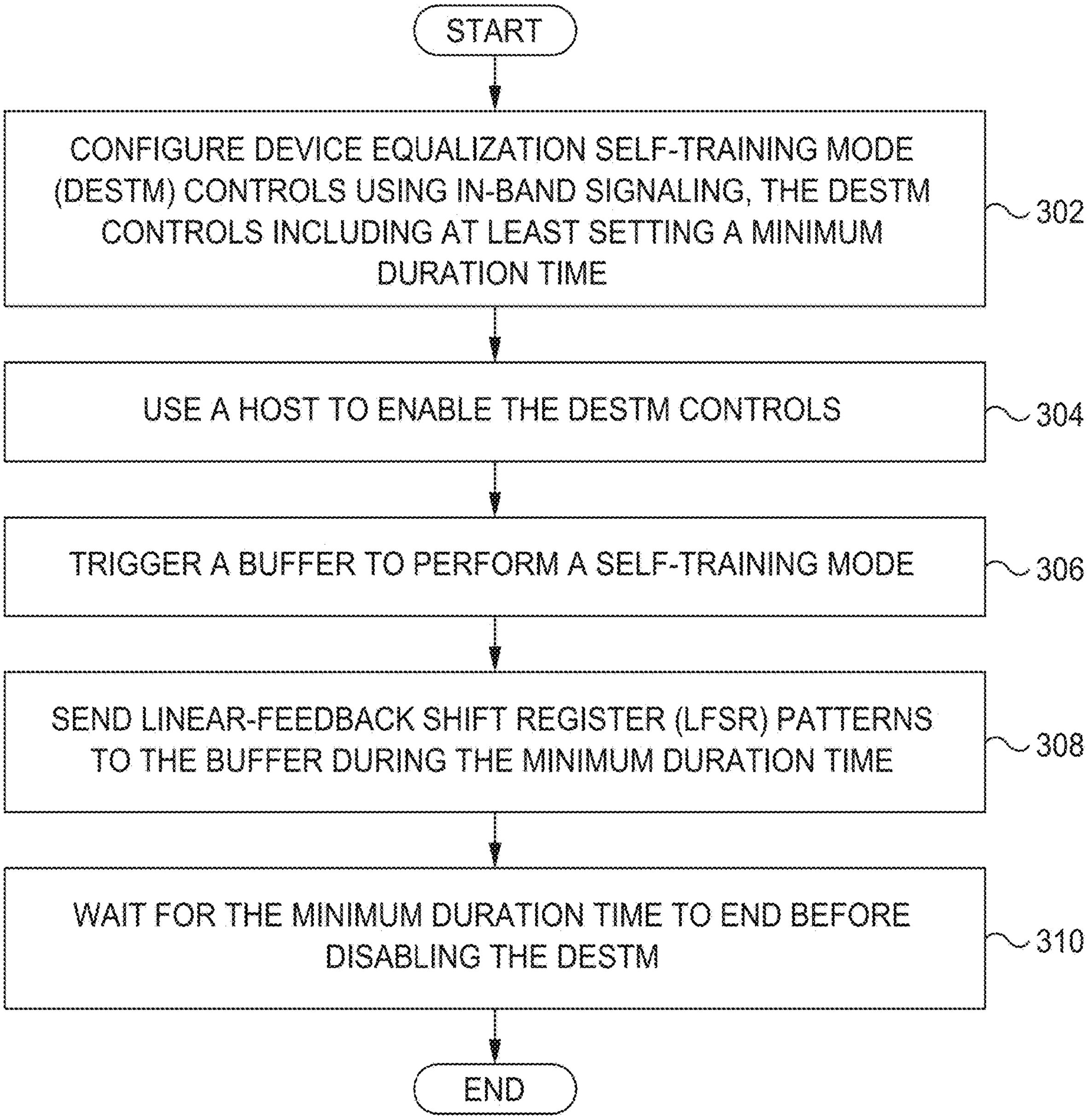
FIG. 3 illustrates a method for performing DDR buffer device equalization self-training with in-band signals, according to an example.

FIG. 3 illustrates a method for performing DDR buffer device equalization self-training with in-band signals, according to an example.

At block 302, device equalization self-training mode (DESTM) controls are configured using in-band signaling, where the DESTM controls include at least setting a minimum duration time. The DESTM controls can further include determining DFE taps, making LFSR selections, and making lane selections. The minimum duration time indicates a time that the self-training mode is active. The minimum duration time is predefined, e.g., by a buffer vendor or manufacturer.

At block 304, a host or processor host is used to enable the DESTM controls. The host can be, e.g., a system-on-chip (SoC) or other type of memory subsystem.

At block 306, a buffer is triggered to perform a self-training mode. The buffer can be, e.g., a registered clock driver (RCD) and/or a DDR data buffer (DB). The buffers can be integrated into, e.g., a dual in-line memory module (DIMM) or registered DIMM (RDIMM). DIMMs connect to a computer's mother board through a double-sided pin connection, enabling a native 64-bit data path throughput.

At block 308, linear-feedback shift register (LFSR) patterns are sent to the buffer during the minimum duration time. The LFSR is a shift register whose input bit is a linear function of its previous state. In other words, the LFSR includes a shift register and a feedback function. LFSRs are used to generate sequences of bits that appear random.

At block 310, the system waits for the minimum duration time to end before disabling the DESTM. When the minimum duration time ends, it is determined whether the self-training of the buffer has been completed. If the self-training of the buffer has been fully completed, the buffer applies the trained results and programs the registers with the trained results. In other words, new equalization values are provided to the registers. If the self-training of the buffer has not been fully completed, the buffer saves the trained results in a temporary buffer. The registers are then provided with the original equalization values. As such, the registers are not updated with the trained results computed during the minimum duration time. However, when the buffer re-enters the self-training mode, at a subsequent time, the buffer can commence the self-training process where it left off previously.

FIG. 4 illustrates a method for performing buffer device equalization self-training with in-band signals for buffers of a dual in-line memory module (DIMM), according to an example.

At block 402, communication between a SoC and a DIMM is enabled, where the DIMM includes a plurality of buffers. A DIMM includes at least two types of buffer components. The buffer components of the DIMM are a registered clock driver (RCD) and/or a DDR data buffer (DB). The RCD communicates with the SoC via a command bus and a clock. The DDR DB communicates with the SoC via data strobe signals. The DIMM is plugged into a motherboard to communicate with the SoC. This allows the SoC to communicate directly with the buffer components of the DIMM.

At block 404, DESTM is enabled for the plurality of buffers of the DIMM. The DESTM is a feature proposed to be added to memory devices.

At block 406, a predefined minimum duration time is configured for a self-training mode by using in-band signaling. The buffer self-training feature was not contemplated to accommodate in-band signaling. Instead, the buffer self-training feature was only contemplated to be compatible with sideband signals of the SidebandBus. The sideband signals are useful during a boot mode. However, the sideband signals are too slow to be used during a mission mode, and are also inaccessible by a user during the mission mode. As such, the example embodiments contemplate using the proposed buffer self-training feature with in-band signaling such that the buffer self-training feature can be used in the mission mode (i.e., during runtime).

At block 408, a host is permitted to enable the predefined minimum duration time. The SoC can provide enablement by, e.g., using a control register. In another example, the enablement can be provided by a new command. In practice, as long as there is a trigger mechanism, the buffer (e.g., RCD) understands that this is the start of the minimum duration time.

At block 410, at least one buffer of the plurality of buffers is triggered to perform the self-training mode. In self-training mode, the buffer automatically performs adjustments without the use of manual intervention or extensive control from the memory controller.

At block 412, LFSR patterns are sent to the at least one buffer of the plurality of buffers during the predefined minimum duration time. The LFSR is a shift register whose input bit is a linear function of its previous state. In other words, the LFSR includes a shift register and a feedback function. LFSRs are used to generate sequences of bits that appear random.

At block 414, the system waits for the predefined minimum duration time to end before disabling the self-training mode. When the minimum duration time ends, it is determined whether the self-training of the buffer has been completed. If the self-training of the buffer has been fully completed, the buffer applies the trained results and programs the registers with the trained results. In other words, new equalization values are provided to the registers. If the self-training of the buffer has not been fully completed, the buffer saves the trained results in a temporary buffer. The registers are then provided with the original equalization values. As such, the registers are not updated with the trained results computed during the minimum duration time. However, when the buffer re-enters the self-training mode, at a subsequent time, the buffer can commence the self-training process where it left off previously.

Therefore, according to FIGS. 1, 3, and 4, executing buffer device equalization in the self-training mode may involve different perspectives, that is, from the host or host processor, the memory, and the overall system.

From the host perspective, buffer device equalization in self-training mode is primarily about initiating and managing the process to ensure optimal signal integrity and performance. From the host perspective, the host sends commands to start the self-training process. This could involve setting specific registers in the memory controller or issuing a special instruction. The host might configure parameters such as training mode, voltage levels, timing parameters, and thresholds that define successful training. The host monitors the progress of the training process, typically through status registers or interrupts. The host ensures the process completes within acceptable timing constraints. Based on feedback, the host may adjust the settings iteratively to optimize the performance. This could involve fine-tuning voltage levels, timing margins, or other relevant parameters. The host validates the results of the training process to ensure that the signal quality and timing are within acceptable limits for reliable operation.

From the memory perspective, self-training involves the memory modules (DRAM) working with the buffer devices to achieve optimal signal levels and timing. From the memory perspective, memory modules initialize their internal training routines upon receiving the command from the host. DRAM chips and buffer devices measure various signal parameters such as voltage levels, timing margins, and noise levels. Based on the measurements, buffer devices adjust their equalization settings. This may involve tweaking impedance levels, adjusting phase relationships, or modifying signal amplitude. DRAM and buffer devices may engage in a feedback loop with the host to report their status and any adjustments made. This ensures that the host can make further adjustments if necessary. Once the optimal settings are found, the memory modules stabilize their configurations and prepare for normal operation.

From a system perspective, self-training for buffer device equalization involves coordination between all system components to ensure reliable and efficient memory operations. The system firmware might initiate the training process during the boot-up sequence or during a specific maintenance cycle. The system monitors the overall health and performance of the memory subsystem. This includes not just individual measurements but also system-wide metrics such as temperature, power consumption, and overall system stability. During training, system resources might be allocated to ensure the process does not interfere with other operations. This could involve temporarily halting certain operations or prioritizing memory access for training purposes. The system implements robust error handling and fallback mechanisms. If the training fails or produces sub-optimal results, the system might retry the process, use default settings, or alert the user/administrator. The system logs the training process, including parameters, results, and any anomalies encountered. This log can be used for diagnostics, future optimizations, or troubleshooting.

Figure 5:
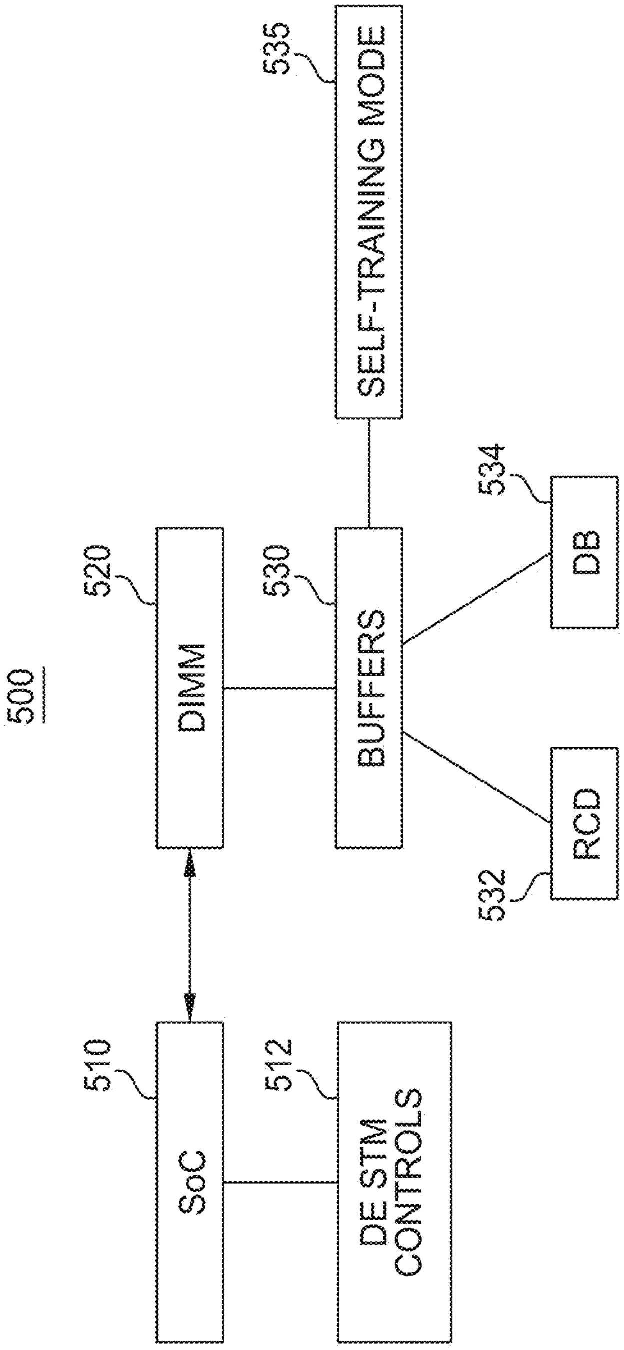
FIG. 5 illustrates a system for performing buffer device equalization self-training with in-band signals for buffers of a dual in-line memory module (DIMM), according to an example.

FIG. 5 illustrates a system 500 for performing buffer device equalization self-training with in-band signals for buffers of a dual in-line memory module (DIMM), according to an example.

In the system 500, the SoC 510 communicates with the DIMM 520. The DIMM 520 includes the plurality of buffers 530. The plurality of buffers 530 may include an RCD buffer component 532 and/or a DB buffer component 534. In one example, the SoC 510 can also be referred to as a host or processor host. The SoC 510 can sequence the RCD buffer component 532 into the self-training mode 535. The self-training mode 535 is focused on equalization, such as DFE for DDR5 technology. After self-training is completed, more accurate equalization values are obtained, as equalization values can be changed over time when, e.g., operating at a high frequency.

In one example, the plurality of buffers 530 may be data buffers. The data buffers may be DDR buffers. The DDR data buffers may manage data transfers between a memory controller and memory modules. The DDR data buffer may include various components, such as, data storage cells, control logic, data path logic, interface logic, clock management circuits, and register interfaces. The data path logic may include multiplexers/demultiplexers and data bus drivers/receivers. The interface logic may include a command interface and a data interface. The command interface may handle commands from the memory controller and the data interface may manage actual data transfer to and from the DRAM (e.g., to the host processor).

Moreover, referring to the system 500 of FIG. 5, device equalization self-training mode (DESTM) controls 512 are configured using in-band signaling, where the DESTM controls 512 include at least setting a minimum duration time. The DESTM controls 512 can further include determining DFE taps, making LFSR selections, and making lane selections. The minimum duration time indicates a time that the self-training mode 535 is active. The minimum duration time is predefined, e.g., by a buffer vendor or manufacturer.

In conclusion, the device equalization self-training mode can be configured by using in-band signaling to process DFE taps, LFSR selection, lane selections, and Min DESTM duration (tck). The Min DESTM duration is a new feature added to the registers. The host then enables DESTM by programming the registers (RWs). The host waits for <DESTN_START> and the buffer goes into the self-training mode. In the meantime, the host drives the LFSR pattern. The buffer starts self-training and uses the first rising edge to determine alignment. The host drives LFSR for at least the minimum time duration (Min DESTM time). The host waits for <tDESTN_COMPLETE>, that is, for the preset minimum time duration to end. The buffer completes self-training and the host is notified that the buffer has completed training. The buffer then pushes the results (i.e., new or updated equalization values) back to the registers. The host then disables the DESTM by programming the registers. As such, buffer equalization self-training mode can be used during in-band signaling, which allows use during the mission mode, when no access to sideband signaling is provided. This advantageously allows for faster processing and advantageously removes any unnecessary interactions between the memory subsystem and the highest level of firmware. Further, such solution is not limited to RCD buffers, but can be extended to DB buffers.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present implementations. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An apparatus comprising:

a host processor configured to:

configure device equalization self-training mode (DESTM) controls using in-band signaling over a double data rate (DDR) interface, the DESTM controls including at least setting a minimum duration time;

enable the DESTM controls;

trigger a data buffer to perform a self-training mode;

send linear-feedback shift register (LFSR) patterns to the data buffer for the minimum duration time via the DDR interface; and wait for a minimum completion time to end before disabling the DESTM, wherein the DESTM controls are configured without using sideband signals.

2. The apparatus of claim 1, wherein the minimum duration time indicates a time that the self-training mode is active.

3. The apparatus of claim 1, wherein the minimum duration time is predefined.

4. The apparatus of claim 1, wherein the host processor enables the DESTM controls by programming a control register.

5. The apparatus of claim 1, wherein the DESTM controls further include determining decision feedback equalization (DFE) taps, making LFSR selections, and making lane selections.

6. The apparatus of claim 1, wherein the data buffer uses a first rising edge as a first alignment point.

7. The apparatus of claim 1, wherein the data buffer executes the self-training mode within the minimum duration time.

8. The apparatus of claim 7, wherein the host processor determines whether the self-training mode has been fully completed within the minimum duration time.

9. The apparatus of claim 8, wherein, if the self-training mode has been fully completed within the minimum duration time, the data buffer is provided with new equalization values.

10. The apparatus of claim 8, wherein, if the self-training mode has not been fully completed within the minimum duration time, the data buffer restores its original equalization values.

11. The apparatus of claim 10, wherein, when the data buffer re-enters the self-training mode at a subsequent time, the data buffer continues the self-training mode from where it left off.

12. The apparatus of claim 1, wherein the data buffer performs the self-training mode during a mission mode without accessing sideband signals.

13. The apparatus of claim 1, wherein the data buffer is at least one of a registered clock driver and a double data rate (DDR) data buffer.

14. A memory comprising:

a data buffer including interface logic and data path logic configured to:

configure device equalization self-training mode (DESTM) controls using in-band signaling over a double data rate (DDR) interface, the DESTM controls including at least setting a minimum duration time;

enable the DESTM controls;

trigger the data buffer to perform a self-training mode;

send linear-feedback shift register (LFSR) patterns to the data buffer for the minimum duration time via the DDR interface; and wait for a minimum completion time to end before disabling the DESTM, wherein the DESTM controls are configured without using sideband signals.

15. The memory of claim 14, wherein the DESTM controls further include determining decision feedback equalization (DFE) taps, making LFSR selections, and making lane selections.

16. The memory of claim 14, wherein the data buffer uses a first rising edge as a first alignment point.

17. The memory of claim 14, wherein the data buffer executes the self-training mode within the minimum duration time.

18. The memory of claim 17, wherein, if the self-training mode has been fully completed within the minimum duration time, the data buffer is provided with new equalization values.

19. The memory of claim 17, wherein, if the self-training mode has not been fully completed within the minimum duration time, the data buffer restores its original equalization values.

20. A system comprising:

a memory; and a host processor in communication with the memory, the host processor configured to:

configure device equalization self-training mode (DESTM) controls using in-band signaling over a double data rate (DDR) interface, the DESTM controls including at least setting a minimum duration time;

enable the DESTM controls;

trigger a data buffer in the memory to perform a self-training mode;

send linear-feedback shift register (LFSR) patterns to the data buffer for the minimum duration time; and wait for a minimum completion time to end before disabling the DESTM, wherein the DESTM controls are configured without using sideband signals.

* * * * *